3,739,040
TERTIARY ALKYLATION OF BENZENE AT
ATMOSPHERIC PRESSURE
Jesse K. Boggs, Houston, Tex., assignor to Esso
Research and Engineering Company
No Drawing. Filed Dec. 28, 1970, Ser. No. 102,249
Int. Cl. C07c 3/56
U.S. Cl. 260—671 P                    12 Claims

ABSTRACT OF THE DISCLOSURE

Benzene is selectively tertiary-alkylated at high conversions by reaction with $C_7$ to $C_{44}$ tertiary alkyl chlorides in the presence of $FeCl_3$ catalyst at atmospheric pressure. The selective alkylation is accomplished by carrying out the reaction at a temperature from about $-10°$ C. to about $+30°$ C. and in the presence of a rapidly boiling solvent. The solvent concentration in the solvent/benzene mixture is from about 5 to about 90 mol percent, preferably from about 15 to about 80 mol percent.

CROSS-REFERENCE TO RELATED APPLICATION

The subject matter of the present invention is related to that described in my copending application Ser. No. 101,921, filed on Dec. 28, 1970 and entitled "Selective Teritary Alkylation of Aromatic Hydrocarbons," which is incorporated herewith by reference.

BACKGROUND OF THE INVENTION

(1) Field of the invention

This invention relates to the Friedel-Crafts catalyzed alkylation of benzene with tertiary alkyl chlorides. The tertiary-alkylated product is a superior lubricant.

(2) Description of the prior art

Alkyl benzenes have been recognized as desirable compounds for various uses. There is much prior art relating to the production of alkyl benzenes, and some of the prior art (such as U.S. Pats. 2,240,583 and 2,894,999) utilizes a boiling solvent as a means for temperature control. None of the prior art, however, has recognized the fact that tertiary alkylation of benzene with bulky tertiary alkyl chlorides can be selectively carried out with high yields at atmospheric pressure by using $FeCl_3$ as a catalyst and employing a boiling solvent to help carry away and HCl which is evolved in the alkylation reaction.

DISCUSSION OF THE INVENTION

Aromatic nuclei having primary or secondary alkyl substituents are subject to thermal and oxidative degradation because they possess at least one benzylic hydrogen atom; i.e., a hydrogen atom on the α-carbon atom of the substituent:

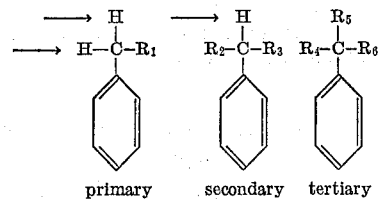

primary   secondary   tertiary

This type of hydogen atom is vulnerable and, under the conditions experienced in lubricating or hydraulic oil service, suffer thermal or oxidative degradation leading to the formation of sludge. While it is desirable to provide a tertiary alkyl substituent of sufficient size to provide the desired physical properties to the resultant compound, it has been found to be difficult to carry out a reaction which yields the tertiary substituent as a selective product.

As disclosed in my copending application Ser. No. 101,921 (above referred to), selective tertiary alkylation can be accomplished by carrying out the reaction under a vacuum and in the presence of a boiling liquid, so as to remove the evolved HCl from the reaction zone rapidly enough to prevent its concentration in the liquid phase from exceeding an acceptable maximum. According to the present invention, acceptable tertiary alkylation of benzene can also be attained at atmospheric pressure (i.e., without employing a vacuum) if $FeCl_3$ is used as the catalyst and a suitable low-boiling solvent or solvent mixture is employed in the reaction zone and maintained in the vigorously boiling state so as to sweep the evolved HCl from the liquid phase as rapidly as it is formed.

According to the present invention, a tertiary alkyl chloride having from 7 to 44 (preferably 7 to 34) carbon atoms can be selectively reacted in the presence of $FeCl_3$ with benzene at atmospheric pressure if the reaction is carried out in a boiling solvent such as butane. While butane has a nominal boiling point of $-0.5°$ C., the temperature of the mixture can be maintained within the range from about $5°$ C. to about $30°$ C. while the butane is rapidly boiling from the liquid phase. Other suitable solvents are discussed hereinafter. It has been found, however, that pentane (which has a boiling point of $36.0°$ C.) is ineffective in the present invention. It is believed that the use of butane is successful because it boils off vigorously at the desired reaction temperature, sweeping from the liquid mixture the HCl evolved in the alkylation reaction:

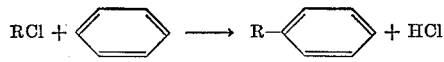

It has been found (as discussed in my copending application Ser. No. 101,921, referred to above) that, unless preventive steps are taken, the evolved HCl builds up in the liquid reaction mass, promoting isomerization of the tertiary alkyl chlorides into secondary and primary alkyl chlorides which then react with the aromatic nuclei to produce undesirable secondary- and primary-alkylated aromtic hydrocarbons. In the present invention, the use of butane as a boiling solvent has proven to be effective in the alkylation of benzene at atmospheric pressure, proving to be somewhat of an exception to the general rule as stated in my copending application that both a boiling liquid and a vacuum are required for successful tertiary alkylation. However, although the results obtained by the present invention are acceptable, the use of a vacuum as claimed in the copending application does provide a less sensitive and preferred process for tertiary alkylation.

Feedstocks.—The tertiary alkyl chloride will be chosen to produce the physical properties desired in the alkylated product. Suitable tertiary alkyl chlorides will have from 7 to 44 carbon atoms, preferably from 7 to 34 carbon atoms, and will have a structure corresponding to the formula:

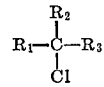

wherein $R_1$ and $R_3$ are alkyl groups having from 1 to 41 carbon atoms, and $R_2$ is an alkyl group having from 1 to 2 carbon atoms, the total number of carbon atoms in the t-alkyl chloride being from 7 to 44.

Exemplary of suitable tertiary alkyl chlorides are 2-chloro-2-methylnonane, 3-chloro-3-ethylpentane, 2-chloro-2-methylhexane, 2-chloro-2-methyloctane, 2-chloro-2-methyldecane, 2-chloro-2-methyldodecane, 2-chloro-2-methyleicosane, etc. Where a mono-t-alkyl substituted product is desired, the tertiary alkyl chloride/benzene molar ratio can range from about 1/40 to about 5/1, preferably from about 1/40 to about 1/1. Where a di-t-alkyl substituted product is desired, the molar ratio of t-alkyl chloride/benzene would be within the range from about 20/1 to about 1/10, preferably from about 10/1 to about 1/2.

The benzene will be substantially pure, but may contain some impurities as is expected in commercial grade chemicals. An exemplary benzene will have the following analysis:

Table I.—Benzene feedstock

| | |
|---|---|
| Specific gravity, 60/60° F. | 0.884. |
| Distillation range, ° C. | 1° including the temperature of 80.1° C. |
| Acidity | No free acid. |
| Acid wash color, max. | 2. |
| Sulfur compounds | Free of $H_2S$, $SO_2$ and thiophene. |
| Copper corrosion | No iridescence or gray or black discoloration. |
| Color | <0.003 g. potassium dichromate in 1 liter of $H_2O$. |
| Solidifying point (dry basis, ° C.) | 5° C., min. |
| Flash, tag open cup, ° F. | 40. |
| Water or suspended matter | Absent. |

Solvent.—The solvent will be used in amounts sufficient for the time of residence in the reaction zone; i.e., in large enough amounts that the solvent can boil rapidly throughout the reaction time without being exhausted from the liquid reaction mass. Using butane as an example, the butane will be used in quantities sufficient to provide a butane concentration in the butane/benzene mixture which is from about 30 mol percent to about 85 mol percent, preferably from about 40 mol percent to about 80 mol percent, based on quantities admitted into the reaction zone. Butane is the preferred solvent.

Other $C_2$ to iso$C_5$ low-boiling paraffinic hydrocarbons such as ethane, propane, isobutane, isopentane and neopentane are suitable for use as solvents. These hydrocarbons may be used alone or in admixture, so long as the solvent or mixture of solvents boils within the desired temperature range at the pressure employed. For example, isopentane is not suitable for use alone, but may be used as a minor constituent of a mixture of these solvents; i.e., as a component of a commercial butane product. The boiling points of these solvent constituents are shown below.

Table II.—Boiling points

| Compound: | Boiling point at 760 mm. Hg, ° C. |
|---|---|
| Ethane | −86 |
| Propane | −39 |
| Butane | 1 |
| Isobutane | −11 |
| Isopentane | 30 |
| Neopentane | 10 |
| Pentane | +36 |

The solvent is used in suitable quantities to provide with benzene a mixture which boils at the desired temperature within the pressure range of 0 to 5 p.s.i.g. This is obtained when the sum of the partial pressures of the solvents and reactants equals the gauge pressure. In general, the solvent will constitute from 5 mol percent to 90 mol percent (preferably, 15 to 80 mol percent) of the solvent/benzene mixture. Since the boiling solvent acts as an autorefrigerant, sufficient heat input must be employed to maintain the system at the desired temperature.

Catalyst.—Low-activity Friedel-Crafts catalysts, preferably $FeCl_3$, are employed in catalytically effective amounts, as is known in the art. For example, from 0.005 to 0.3 mol of catalyst (preferably from 0.01 to 0.1 mol) will be used per mol of the alkyl chloride. Usually an excess of catalyst is employed to assure complete saturation of the liquid phase with the soluble catalyst. Economically, a practical minimum amount will be used. Highly active catalysts (such as $AlCl_3$) are not suitable, since the HCl concentration in the reaction mixture reaches a value which is too high for these catalysts, leading to formation of undesirably large amounts of secondary alkyl benzenes. Therefore, Friedel-Crafts catalysts which are no more active than $FeCl_3$ should be used.

Reaction conditions.—The reaction will be carried out at pressures from 0 to 5 p.s.i.g., with substantially atmospheric pressure being preferred. The reaction temperatures may range from −10° C. to +30° C., preferably from 5° C. to 20° C., and will be chosen to suit the particular tertiary alkyl chloride being employed. Residence time (based on benzene) in the reaction zone may be from about 10 minutes to about 900 minutes, preferably from about 30 minutes to about 240 minutes. The catalyst can be added as a solution in the alkyl chloride, as a slurry, or maintained in a stationary or moving bed, all as is well known in the art. The use of a stirred reactor is preferred.

Products.—The tertiary alkylated benzenes may be used for lubricants, greases, hydraulic oils, etc., depending upon the viscosity and other physical properties of the product. Exemplary synthetic oils and their uses are shown below.

TABLE III.—SYNTHETIC OILS

| Compound average formula [1] | Viscosity centistokes at 210° F. | Pour point, ° F. | Boiling range, ° F. | Use |
|---|---|---|---|---|
| $C_{21}H_{43}$ alkyl benzene. | 3.9 | −40 | 650–845 | Lube oil. |
| $C_{27}H_{55}$ alkyl benzene. | 6.6 | −25 | 720–935 | Grease base oil. |
| $C_{16}H_{33}$ alkyl benzene. | 2.6 | −60 | 550–770 | Hydraulic oil for low temperature service. |

[1] The carbon numbers refer only to the alkyl substituents.

EXAMPLES

In order to illustrate the effectiveness of the present invention, the following runs are given:

Example 1

An admixture of 22 cc. of benzene, 50 cc. of butane, and 9 grams of 3-chloro-3-ethylpentane with 0.5 gram of ferric chloride was heated in a flask at atmospheric pressure and maintained at a temperature within the range from 13° C. to 20° C. with the butane boiling rapidly. The reaction appeared to begin at about 10° C., but was quite slow until a temperature range of about +13° C. to about +20° C. was reached. Then, HCl gas rapidly evolved. At the end of about 30 minutes, the tertiary alkyl chloride was completely reacted and the heating was terminated. HCl concentration throughout the reaction was calculated to be less than 0.004 mol fraction. The product was recovered and found to have the following analysis by NMR—100 mHz.:

| | Percent |
|---|---|
| Tertiary substituted benzene | 95.6 |
| Secondary substituted benzene | 4.4 |
| Primary substituted benzene | — |
| | 100.0 |

Conversion was 94% based on the alkyl chloride.

Example 2

The procedure of Example 1 was followed using excess boiling benzene and with the butane omitted. Note the negligible conversion that was obtained. The product had the following analysis:

| | Percent |
|---|---|
| Tertiary substituted benzene | 81 |
| Secondary substituted benzene | 19 |
| Primary substituted benzene | — |
| | 100 |

Conversion was less than 1% based on the alkyl chloride. HCl concentration varied since most of the chloride was converted to the olefin.

Example 3

A procedure similar to Example 1 was followed using n-pentane as the boiling solvent. The charge was:

| | |
|---|---|
| Benzene | 156 g. (2 mols). |
| n-Pentane | 144 g. (2 mols). |
| $FeCl_3$ | 2 g. (0.013 mol). |

This was brought to the boiling point under atmospheric pressure and to this was slowly added:

| | |
|---|---|
| Benzene | 39 g. (0.5 mol). |
| 3-chloro-3-ethylpentane | 67.5 g. (0.5 mol). |

The boiling temperature was 49–51° C. Conversion was less than 5%, believed to consist of about 95% tertiary alkylated benzene and about 5% secondary alkylated benzene. The solvent mixture provided a reaction temperature which was much higher than the 30° C. upper limit for the temperature range within which the present process is to be carried out.

Example 4

An admixture of 585 g. of benzene and 803 g. of butane with 13.3 g. of aluminum chloride was heated in a flask at atmospheric pressure and maintained at a temperature of 9° to 25° C. over a one and one-half hour period during which time 135 g. of 3-chloro-3-ethylpentane was added and the butane boiled rapidly. At the conclusion of the reaction, the alkylated product was recovered and found to have the following analysis:

| | Percent |
|---|---|
| Tertiary substituted benzenes | <5 |
| Secondary substituted benzenes | >95 |
| Primary substituted benzenes | — |

Conversion was 83%. The HCl concentration in the reaction liquid phase during the initial part of the reaction was 0.015 mol fraction, nearly four times as great as that in Example 1. This was three times as great as the maximum desirable. HCl concentration for selected tertiary alkylation with $AlCl_3$ as specified in my copending application Ser. No. 101,921, referred to above. The higher concentration caused isomerization to the secondary alkyl product during alkylation. Example 4 illustrates how selectivity for tertiary alkylation is lost when employing $AlCl_3$ as a catalyst, even though boiling butane is present in the reaction zone.

I claim:

1. A process for selectively tertiary-alkylating benzene at substantially atmospheric pressure which comprises reacting benzene with a tertiary alkyl chloride in contact with a Friedel-Crafts catalyst which is no more active than $FeCl_3$ and in admixture with a rapidly boiling solvent at a temperature within the range from about −10° C. to about +30° C., wherein the tertiary alkyl chloride contains from 7 to 44 carbon atoms, the solvent concentration in the solvent/benzene mixture is from about 5 to about 90 mol percent, and the tertiary alkyl chloride-to-benzene mol ratio is from about 1:40 to about 20:1.

2. A process in accordance with claim 1 wherein the pressure is from about 0 p.s.i.g. to about 5 p.s.i.g.

3. A process in accordance with claim 2 wherein the catalyst is $FeCl_3$.

4. A process in accordance with claim 3 wherein the solvent concentration is from about 15 to about 80 mol percent, based on the solvent/benzene mixture.

5. A process in accordance with claim 4 wherein the solvent consists essentially of butane.

6. A process in accordance with claim 5 wherein the tertiary alkyl chloride is 3-chloro-3-ethylpentane.

7. A process for selectively tertiary-alkylating benzene at pressures from about 0 p.s.i.g. to about 5 p.s.i.g. which comprises:
   in a reaction zone and at a temperature within the range from about −10° C. to about +30° C., and containing a catalytically effective amount of $FeCl_3$, reacting a $C_7$ to $C_{34}$ tertiary alkyl chloride with benzene in the presence of a rapidly boiling solvent,
   said solvent boiling within the temperature range from about −10° C. to about +30° C., at the pressure employed, and being chosen from the group consisting essentially of butane, isobutane, isopentane, neopentane, and admixtures thereof with each other, and with minor amounts of propane and ethane, and said solvent concentration being from about 5 to about 90 mol percent based on the amounts of solvent and benzene in the reaction zone.

8. A process in accordance with claim 7 wherein the molar ratio of tertiary alkyl chloride to benzene is from about 1:40 to about 5:1.

9. A process in accordance with claim 8 wherein the solvent is butane.

10. A process in accordance with claim 9 wherein the solvent concentration is from about 15 to about 80 mol percent, the tertiary alkyl chloride-to-benzene mol ratio from about 1:40 to about 1:1, and the temperature is from about 5° C. to about 20° C.

11. A process in accordance with claim 1 wherein the temperature is from about 5° C. to about 20° C.

12. A process in accordance with claim 7 wherein the temperature is from about 5° C. to about 20° C.

References Cited

UNITED STATES PATENTS

| | | | |
|---|---|---|---|
| 2,816,940 | 12/1957 | Schlatter | 260—671 R |
| 2,796,429 | 6/1957 | Kreps et al. | 260—671 B |
| 2,840,621 | 6/1958 | Corson et al. | 260—671 P |
| 2,880,250 | 3/1959 | Meyerson et al. | 260—671 B |
| 2,992,282 | 7/1961 | Schmerling | 260—671 B |
| 3,173,965 | 3/1965 | Pappas et al. | 260—671 G |

CURTIS R. DAVIS, Primary Examiner

U.S. Cl. X.R.

260—671 B, 671 C